Oct. 27, 1936. M. F. SANDMAN 2,059,039
DEVICE FOR CATCHING DUST FROM GRINDING INSTRUMENTS
Filed Aug. 10, 1934

INVENTOR.
MERVIN F. SANDMAN,
BY
Ellis S. Middleton
ATTORNEY.

Patented Oct. 27, 1936

2,059,039

UNITED STATES PATENT OFFICE 2,059,039

DEVICE FOR CATCHING DUST FROM GRINDING INSTRUMENTS

Mervin F. Sandman, South Orange, N. J.

Application August 10, 1934, Serial No. 739,195

5 Claims. (Cl. 51—270)

My present invention relates to a device for inclosing the area of grinding operations in a transparent housing.

The principal object of the invention is to provide a device of the above type particularly adapted for the use of dentists, although not limited thereto.

In grinding operations where use is made of a rotary grinding device, the abraded powder or filings are often of material value such for instance when a dentist works upon a tooth or inlay of precious metal. This grinding operation in addition involves some physical hazard as it frequently occurs that a piece of the metal or other material being ground is propelled by the action of the grinding wheel away from the area of operations and into the operator's eyes. An important object of the invention, therefore, is to provide a device of a character described which will permit the retention and salvaging of the grindings where they are of value, while, at the same time, protecting the operator from any particles which may be propelled away from the area of operations.

Other objects will appear as the description proceeds.

To this end, the invention contemplates a body or housing having a transparent area through which the field of operations may be viewed, and having open ends through which the operator may readily insert his hands in performing the grinding operations. The material of which the body may be made may consist of any suitable transparent material such as glass, celluloid, cellulose acetate films or the like. Obviously, the body may have only a transparent area or, on the contrary, it may be made completely of such transparent material.

In the preferred form of the invention, the body may be conveniently constructed of a cylinder of glass or the like with open ends, and of a diameter which will permit the operator to insert a hand at each end to conduct the grinding operation. A suitable base may be provided to prevent displacement of the body or housing and this base may be readily detachable from the housing in order to shake a brush or otherwise remove the grindings from it or salvage or dispose of the grindings as desired.

Where desired, a magnifying lens may be mounted adjacent the field of operations to assist the operator, as frequently, in the case of dental work, the inlays worked upon are very small and a magnifying glass or lens gives the desired enlargement.

In some cases, it may be found desirable to make the body of a high quality glass or the like by rolling operations rather than as a cast product.

In another modified form, the invention may include a body having a slit or opening adapted to receive a removable magnifying lens. This permits of the use of lenses of varying magnifications to suit the work in hand and the operator's eyesight. The invention further consists in the novel arrangement, combination and construction of parts more fully hereinafter described and shown in the drawing.

In the drawing, Fig. 1 is a perspective view of a device embodying the invention showing its manner of use.

Figure 1:
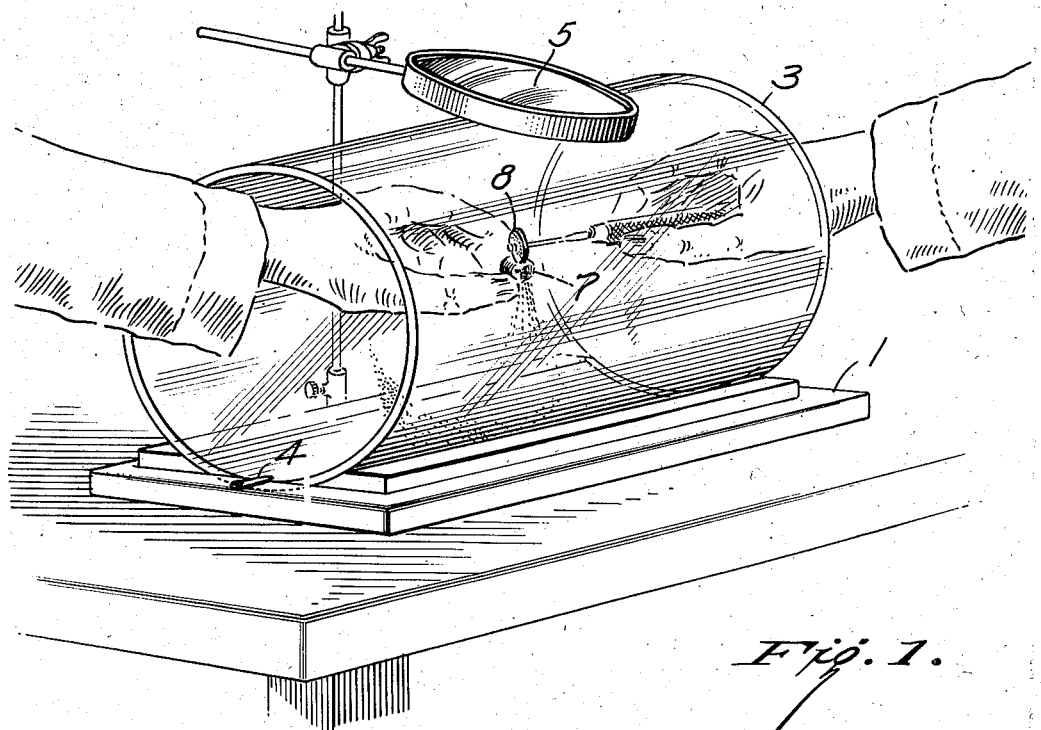
Figure 2:
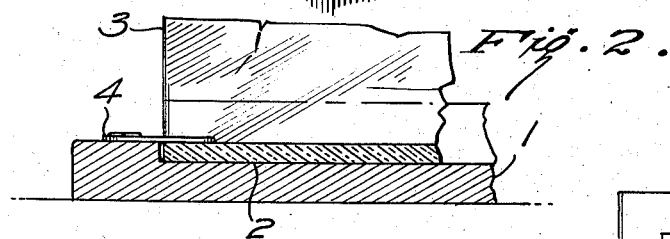
Fig. 2 is a fragmentary sectional view showing the cylinder seated in the base.
Figure 3:
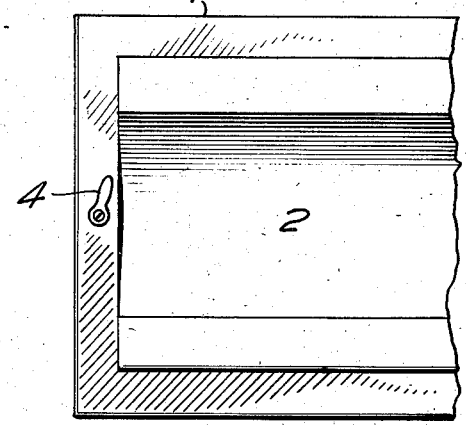
Fig. 3 is a fragmentary plan view of a portion of the base indicating the depression therein.

Referring now with particularity to the drawing, a base 1 of wood or other suitable material is provided with a depression 2 adapted to receive the body, which in the case of Fig. 1 is a cylindrical member 3 of suitable transparent material of which glass is typical. When used with the body of Fig. 1, the base 1 should have a depression therein being a surface of revolution in order to give adequate support to the body.

Hinged latches 4 are mounted on the base 1 for engagement with the body 3 in a detachable manner.

Where desired, a magnifying lens 5 may be mounted upon a suitable standard carried by the base 1 and arranged for adjustment to accommodate itself to the field of operations.

Figure 4:
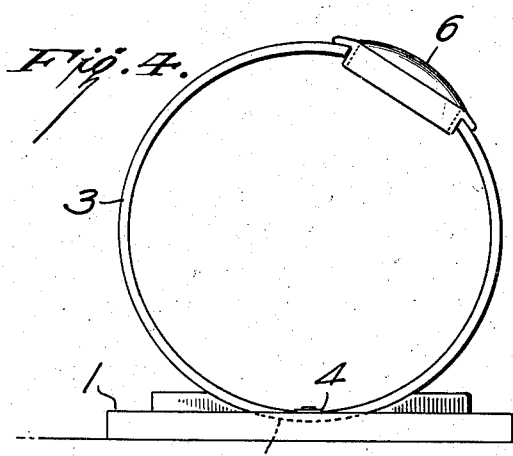
Fig. 4 is an end view of a modified form of the device showing a lens arrangement.

A slightly modified form of body is shown in Fig. 4 wherein the body 3 is provided with an aperture or longitudinal slit into which may be received a longitudinally extending lens 6 having a bottom contour of a shape to be received by the aperture in the body. An arrangement of this character permits the use of lenses of various magnifications where desired, while the lens itself closes the aperture and prevents the accidental escape of the ground material.

Obviously the lenses 5 and 6 may be initially formed in the transparent material of the body 3 where desired.

In use and referring to the embodiment shown in Fig. 1, the cylinder 3 is placed upon the base 1 and the latches 4 swung into engagement with the body. The lens 5 is suitably adjusted to include the field of operations, whereupon the operator may insert both hands through the open ends of the body, one hand grasping the work piece 7 to be ground while the other hand grasps the grinding instrument 8.

In using the device of Fig. 4 it is only necessary to slightly rotate the body 3 about its longitudinal axis until the lens 6 includes the field of operations.

In all cases, due to the fact that the ends of the body are completely open, it is a simple matter to detach the body from the base and shake, sweep or otherwise remove the filings therefrom.

While the invention has been described and shown in connection with certain embodiments, yet, obviously, I do not wish to be limited thereto and the invention is to be construed broadly and restricted only by the scope of the claims.

I claim:

1. In combination, an open-ended cylindrical body of glass, said body having a longitudinal opening therein, and a magnifying lens mounted above said opening.

2. In combination, an open-ended cylindrical body of glass, said body having a longitudinal opening therein, and a magnifying lens mounted in said opening.

3. In combination, a supporting base, an open-ended transparent housing above the base, said housing having an opening in a wall thereof adapted to receive a magnifying lens, said wall opening extending the full length of the housing.

4. In combination, a supporting base, an open-ended transparent housing above the base, said housing having an opening in a wall thereof and a magnifying lens mounted in relation to said opening so that the field of operations may be viewed through the lens and the opening.

5. In combination, a base, a housing supported by said base, said housing having a transparent portion, and openings for access of an operator's hands to the interior thereof whereby work may be manipulated therein, and a magnifying lens detachably mounted in said transparent portion.

MERVIN F. SANDMAN.